US010121060B2

(12) United States Patent
Shoemaker et al.

(10) Patent No.: US 10,121,060 B2
(45) Date of Patent: Nov. 6, 2018

(54) AUTOMATIC GROUP FORMATION AND GROUP DETECTION THROUGH MEDIA RECOGNITION

(71) Applicant: OATH INC., New York, NY (US)

(72) Inventors: Austin Shoemaker, San Francisco, CA (US); Howard Law, Brisbane, CA (US); Hamoun Parvizi, South San Francisco, CA (US); Venkat Krishnaraj, San Francisco, CA (US); Soujanya Bhumkar, Palo Alto, CA (US)

(73) Assignee: OATH INC., New York, NY (US)

( * ) Notice: Subject to any disclaimer, the term of this patent is extended or adjusted under 35 U.S.C. 154(b) by 645 days.

(21) Appl. No.: 14/622,223

(22) Filed: Feb. 13, 2015

(65) Prior Publication Data

US 2015/0227609 A1 Aug. 13, 2015

Related U.S. Application Data

(60) Provisional application No. 61/939,603, filed on Feb. 13, 2014.

(51) Int. Cl.
*G06F 7/00* (2006.01)
*G06F 17/30* (2006.01)
*G06K 9/00* (2006.01)
*G06K 9/62* (2006.01)

(52) U.S. Cl.
CPC ... *G06K 9/00295* (2013.01); *G06F 17/30047* (2013.01); *G06F 17/30277* (2013.01); *G06K 9/00677* (2013.01); *G06K 9/6254* (2013.01)

(58) Field of Classification Search
CPC .................. G06F 17/30598; G06K 9/00295
USPC ........................................... 707/737
See application file for complete search history.

(56) References Cited

U.S. PATENT DOCUMENTS 8,300,898 B2  10/2012  Bak et al.
8,422,747 B1*  4/2013  Leung .................. H04L 51/32
                                                382/118
8,539,086 B2   9/2013  Mallet et al.
9,516,218 B1* 12/2016  Tohidi ............... H04N 5/23222
(Continued)

FOREIGN PATENT DOCUMENTS

EP       2462522      6/2012
WO    WO 2011017653   2/2011

*Primary Examiner* — Binh V Ho
(74) *Attorney, Agent, or Firm* — James J. DeCarlo; Greenberg Traurig, LLP

(57) ABSTRACT

Disclosed is a method and system for automatically forming a group to share a media file or adding the media file to an existing group. The method and system includes receiving, by a processor, a media file comprising an image, identifying, by the processor, the face of a first person in the image and the face of a second person in the image, identifying, by the processor, a first profile of the first person from the face of the first person and a second profile of the second person from the face of the second person, automatically forming, by the processor, a group of recipients in a messaging application, the forming of the group of recipients based on the first profile and the second profile, the group of recipients comprising the first person and the second person; and sharing, by the processor, the media file with the group.

17 Claims, 5 Drawing Sheets

(56) References Cited

U.S. PATENT DOCUMENTS

| | | | |
|---|---|---|---|
| 2005/0207622 A1* | 9/2005 | Haupt | G06K 9/00288 382/118 |
| 2007/0140532 A1* | 6/2007 | Goffin | G06K 9/00288 382/118 |
| 2007/0162432 A1* | 7/2007 | Armstrong | G06F 17/30867 |
| 2009/0037477 A1* | 2/2009 | Choi | G06F 17/30259 |
| 2009/0252383 A1* | 10/2009 | Adam | G06K 9/00288 382/118 |
| 2010/0211885 A1* | 8/2010 | Berg | G06F 17/243 715/745 |
| 2010/0318510 A1* | 12/2010 | Ryu | G06F 17/30265 707/722 |
| 2011/0052012 A1* | 3/2011 | Bambha | G06F 17/30256 382/118 |
| 2011/0243397 A1* | 10/2011 | Watkins | G06F 17/30259 382/118 |
| 2011/0305374 A1* | 12/2011 | Chou | G06F 17/30259 382/118 |
| 2011/0307542 A1* | 12/2011 | Wang | G06F 17/30268 709/203 |
| 2012/0076367 A1* | 3/2012 | Tseng | G06K 9/00288 382/118 |
| 2012/0114199 A1* | 5/2012 | Panyam | G06K 9/00288 382/118 |
| 2012/0250950 A1* | 10/2012 | Papakipos | G06F 17/30247 382/118 |
| 2012/0314915 A1* | 12/2012 | Ochi | G06K 9/00677 382/118 |
| 2013/0021490 A1* | 1/2013 | James | H04N 19/56 348/222.1 |
| 2013/0027569 A1* | 1/2013 | Parulski | H04N 5/232 348/207.1 |
| 2013/0077835 A1* | 3/2013 | Kritt | G06K 9/00288 382/118 |
| 2013/0262588 A1* | 10/2013 | Barak | H04L 67/22 709/204 |
| 2014/0152833 A1* | 6/2014 | Itoi | G06K 9/00288 348/157 |
| 2014/0215492 A1* | 7/2014 | Ross | G06F 9/546 719/314 |
| 2014/0223474 A1* | 8/2014 | Wang | H04N 21/4415 725/34 |
| 2015/0213305 A1* | 7/2015 | Sundstrom | G06K 9/00281 382/118 |

\* cited by examiner

AUTOMATIC GROUP FORMATION AND GROUP DETECTION THROUGH MEDIA RECOGNITION

CROSS REFERENCE TO RELATED APPLICATIONS

This patent application claims the benefit of U.S. Provisional Patent Application Ser. No. 61/939,603, titled "Automatic Group Formation and Group Detection Through Media Recognition" filed on Feb. 13, 2014, the contents of which are incorporated herein by reference.

TECHNICAL FIELD

The subject matter described herein generally relates to the field of media sharing and social networking. Specifically, the present disclosure relates to automatically defining a group of members within a media sharing service based on tags automatically generated during the processing of a media file.

BACKGROUND INFORMATION

As portable communication devices such as cellular phones, tablet computers, and laptop computers continue to evolve, improved audio, video, and still image capturing features are typically introduced with each new model. At the same time, the opportunity for users of these devices to capture and share various forms of content with others continues to increase.

In some situations, a user may distribute content in the form of media files to others by way of specifically determining the recipients of the content by manually attaching the media file to an e-mail, "picture mail," or similar communication message, and then transmitting the message and attached content from the user's communication device to one or more recipients. Typically, the user distributing the content has pre-programmed certain contact information, such as an e-mail address or telephone number. Alternatively, the user's communication device may also be connected to a recipient via a social network.

However, the task of manually attaching media files and selecting the relevant recipient information can get tedious and cumbersome if either the quantity of media files or number of recipients becomes too large. Also, in such a scenario, the user is burdened with the task of manually grouping together media files that may be related. Thus, when a user wants to share a special moment, he or she is forced to spend time sorting, labeling, and distributing media files rather than focusing on the actual event.

SUMMARY OF THE INVENTION

The present disclosure describes methods and systems for facilitating automated group definitions for sharing content through the utilization of media recognition methods. Two features of such automated group definition include (1) determining the formation of new groups and (2) the detection of existing groups.

In one aspect, a system and method may use a facial recognition algorithm to detect the presence of one or more faces that indicates the presence of one or more persons in a media file. The system may then use a data sample of a detected individual's face to gain information about the individual by sending queries to a database or social network to identify the person's name and contact information. After identifying the name of an individual in the media file, the system can create a recipient list based off of the name and the individual's corresponding contact information. Similarly, the system and method may use scene and object recognition algorithms to suggest a title for the group or a caption for shared content. Finally, the system and method may use location and network information to suggest additional members of the group.

In one embodiment, the system and method may detect the existence of a group that already lists all the individuals identified in a media file. If such an existing group is found, the system will contribute the new media files to the existing group. Similarly, scene and object recognition algorithms may detect if there is an existing group with a related title, subject or content and the system may contribute the new media files to that group. Finally, location and network detection methods may detect if there are larger groups that have an existing subset group and the system and method may then suggest members to add to the subset group.

Additional embodiments may implement various combinations of recognition algorithms to detect scenes, objects, location, and networks in media files to automatically create or contribute content to groups.

DETAILED DESCRIPTION

Figure 1:
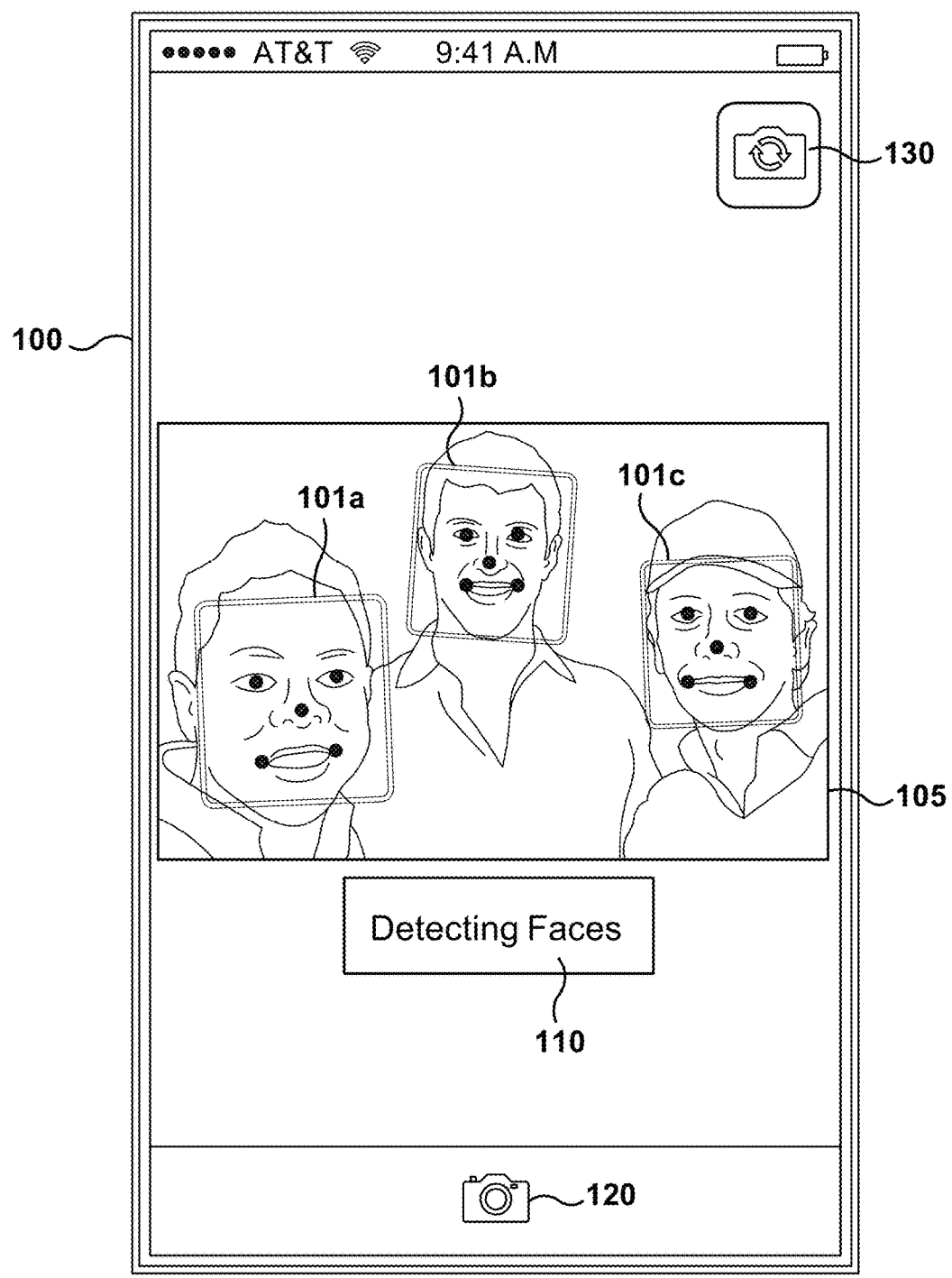
FIG. 1 depicts a user interface for automatically recognizing faces within a photo captured by a camera on a mobile device in accordance with an embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Definitions

The term "mobile device" is intended to refer to any generally portable device having network access (e.g. Internet access) and including a camera or video capturing mechanism. Of note, such network access may be available to the mobile device wirelessly and/or through a wired mechanism (such a wired mechanism may include a removable plug or the like, so that portability is maintained).

The term "application" (such as used in the context of an application associated with a mobile device) is intended to refer to a mechanism that provides the functionality described herein.

The term "camera" (such as used in the context of a camera included with a mobile device or externally connected) is intended to refer to a mechanism that provides still image capture and/or video image capture.

The term "internet access" is intended to refer to the ability to directly or indirectly connect (e.g., bi-directionally) with the Internet. Internet access may be selected from the group including (but not limited to): access via wi-fi, access via bluetooth, access via a cell phone network (e.g., a 2g network, a 3g network, or a 4g network), and access via a wired mechanism (such a wired mechanism may include a removable plug or the like, so that portability is maintained).

The term "friend" is intended to refer to a member of a social networking service who has indicated a willingness to be identified as such with respect to another person or persons. The term may also refer to a person as noted in a user's contact list, such as in the address book of an email application or service.

The term "social network" is intended to refer to a website or application that enables users to communicate with each other by posting information, comments, messages, images, videos, etc. A social networking service may be one of, but not limited to, the following exemplar services: Facebook®, Google+®, Twitter®, Instagram®, Foursquare®, LinkedIn® and Flickr®.

The term "client system" is intended to mean systems that may send queries to and receive data from a visual query server system. The client system may be any computer or other device that is capable of communicating with the visual query server system. Examples include, without limitation, desktop and notebook computers, mainframe computers, server computers, mobile devices such as mobile phones and personal digital assistants, network terminals, and set-top boxes.

Figure 5:
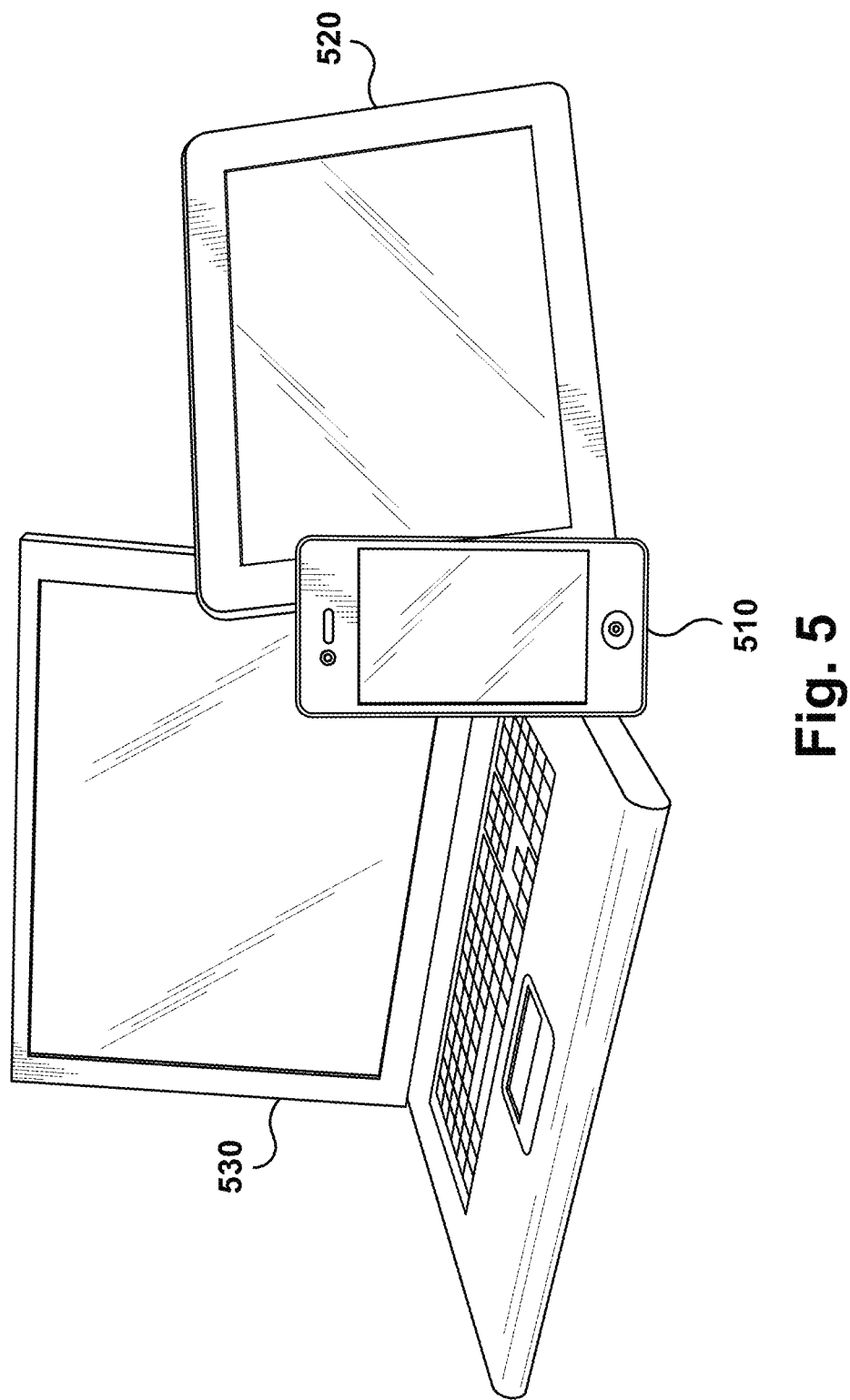
FIG. 5 illustrates exemplary mobile devices that may serve as client devices in accordance with an embodiment of the present disclosure.

The term "client device" is intended to mean a device that can operate as a client system. FIG. 5 depicts exemplar mobile devices that may operate as client devices. A client device may be, but may not be limited to, any one of the following: a mobile phone 510, a tablet device 520, a laptop computer 530.

The term "visual query" refers to an image or video that is submitted as a query to a search engine or search system. Examples of visual queries, without limitations, include photographs, scanned documents and images, videos and drawings.

The term "search service" is intended to refer to a system that extracts textual tags of a visual query from a client system and searches the database against those tags these tags include but are not limited to user profiles, objects, scenes and other metadata.

Embodiments

Example methods and systems for the forming of user groups primarily for the sharing of content, including, for example, photographs, audio content, video content, and textual content, are described. In the following description, for purposes of explanation, numerous details are set forth in order to provide a thorough understanding of example embodiments. However, it will be evident to one skilled in the art that the present subject matter may be practiced without these specific details. It will also be evident that the types of software development described herein are not limited to the examples provided and may include other scenarios not specifically discussed.

User Interfaces

FIG. 1 depicts a user interface 100 for automatically recognizing faces 101a, 101b, 101c within a photo 105 captured by a camera on a client device, according to one embodiment. The camera icon 120 at the bottom of the user interface 100, when tapped, may capture a photo. The camera icon 130 on the top right, when tapped, may toggle between the back facing camera and the front facing camera on the client device. Once a photo 105 is captured, the client device may begin detecting faces in the image 110. Once a face is recognized, squares 101a, 101b, 101c may be placed around the faces. Dots may be used to recognize features and placement unique to each face. These placement and measurements may be used to create a unique visual map that may then be used to query social networks (or another database of media) to uniquely identify each of the faces. The interface depicted in FIG. 1 appears within a proprietary mobile application for group sharing and messaging.

Figure 2:
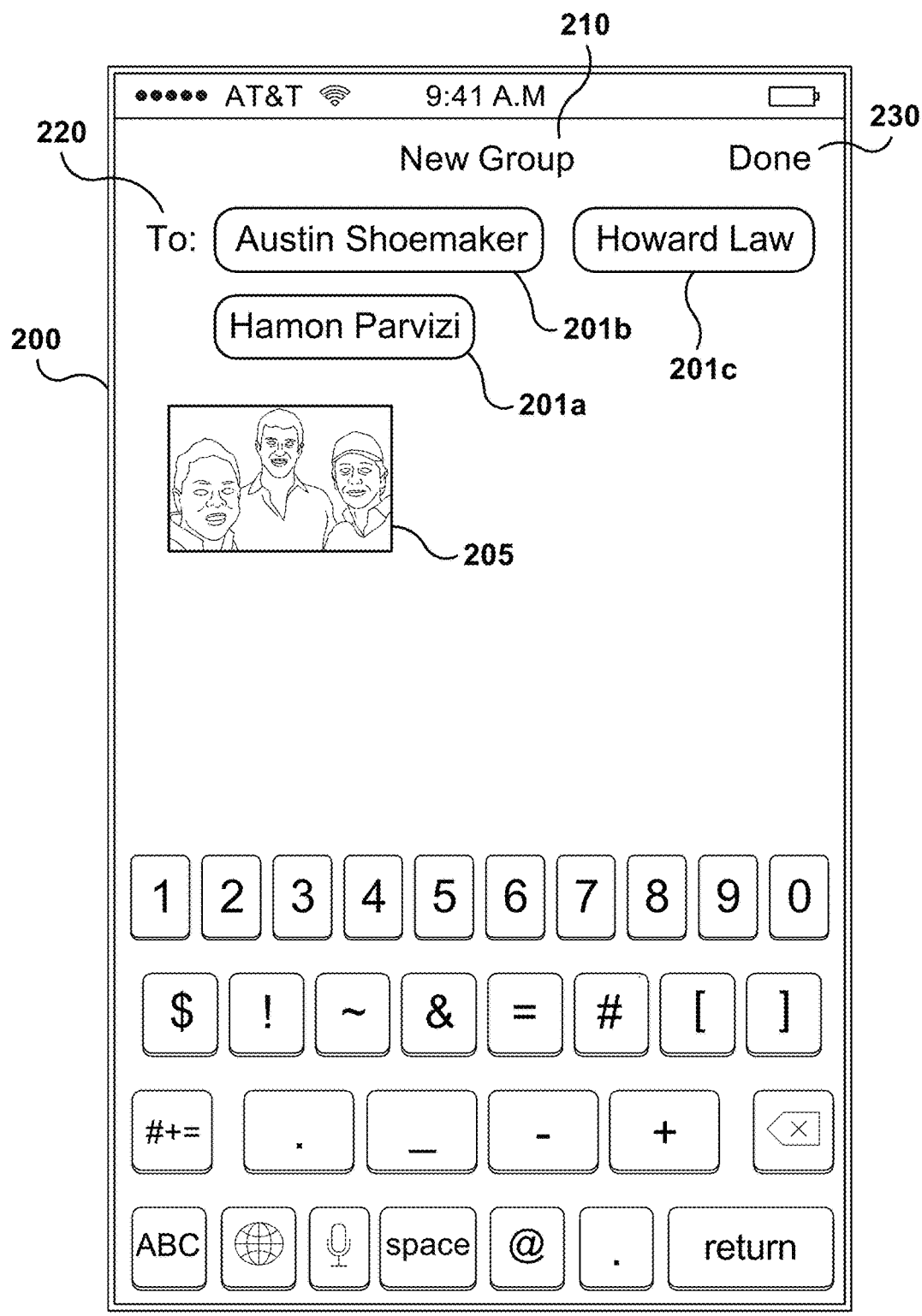
FIG. 2 depicts a user interface for automatically forming a group of members of a media sharing service based on faces recognized in an image in accordance with an embodiment of the present disclosure.

FIG. 2 depicts a user interface 200 for automatically forming a user group 210 consisting of group members 201a, 201b, 201c of a media sharing service based, at least in part, on faces recognized in an image 205, according to one embodiment. This interface 200 may appear once the photo 205 is captured or selected and the faces 101a, 101b, 101c are identified. The "new group" title 210 may indicate that a new group is being formed. In this example, Austin, Hamon, and Howard are individuals whose faces were detected and have been automatically populated into the "To:" field 220. Once the "Done" button 230 is pressed a new user group 210 is created and the participants 201a, 201b, 201c may now interact with each other by sharing, among other things, comments, more photos, and additional media. The interface depicted in FIG. 2 appears within a proprietary mobile application for group sharing and messaging.

Group Formation and Detection

In a client device, a user interface module 100 may be used to facilitate a user's access to various aspects of shared content 105 within a user group 210, including, but not limited to, providing explicit input as to which group to join, posting content to the group, and receiving content posted by other members of the user group 210.

Figure 3:
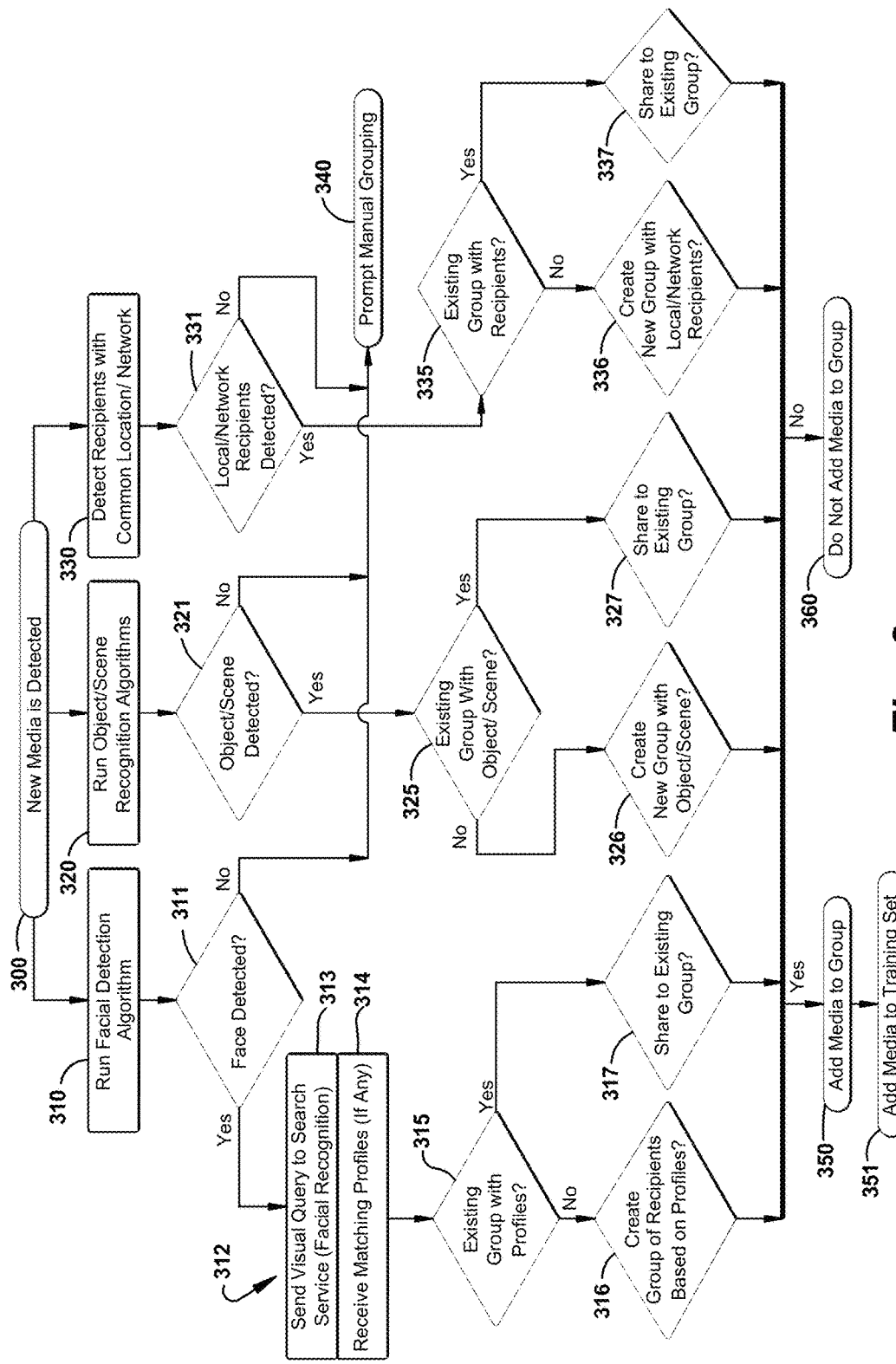
FIG. 3 is a flowchart illustrating a process in which a media sharing service determines how to group new media files in accordance with an embodiment of the present disclosure.

Specifically, FIG. 3 depicts a system and method in which, when new media is detected 300, various applications of media and context recognition technology 311, 321, 331 may be leveraged for defining and creating new user groups as well as for contributing to existing user groups. Generally, new groups 316, 326, 336 may be formed when the system determines that the analyzed media does not belong in an existing group 315, 325, 335. Similarly when the system determines that the analyzed media belongs to an existing group 315, 325, 335, the analyzed media may be shared to the existing user groups 317, 327, 337, respectively.

Using facial recognition methods 310, the analyzed faces 311 in a media file may be processed at a server 312 in the form of a visual query being sent to a search service 313. If any of the faces are recognized, the matching profiles 314 may be used to populate members in a new group 316. When a set of people are recognized in a photo 314, and a user group with that exact same member constellation already exists, the existing user group may be detected 315 and user may be given the option 317 to have the new media be shared into the group 350. Alternatively, a user may choose to not add the new media to a group 360.

Similarly, the system may also utilize scene and object recognition methods 320 to help in forming and detecting groups. Using such methods, the analyzed scenes and objects 321 in a media file may be used to determine whether the new media 300 belongs in a new group 326. If an existing group already features the recognized scene or objects, the existing user group may be detected 325 and the user may be given the option 327 to have the new media be shared into the group 350.

Additionally, when appropriate, scene and object recognition methods 320 may be used to create relevant group titles and media captions. In cases when new user groups are formed, the output of the analysis may be used to populate both user group titles and/or the first message posted to the user group. In the cases where a user group containing the scene or object already exists, the output of the analysis may be used to generate appropriate captions that may be shared in connection with the media.

Furthermore, location and network recognition methods 330 may be used to automatically populate the members of a user group as well. With these methods, people in the same vicinity or on the same network, may be prompted to join a newly formed user group consisting of other people in that same vicinity or network 336. Alternatively, location and network analysis may be leveraged to add new members to an already existing user group 335, prompting the existing user group members to confirm the addition of new members that were detected on the same network or identified in the vicinity 337.

Alternatively, if none of the aforementioned methods (facial 311, object/scene 321, and local/network 331 methods) detect any usable information, the system may prompt the user to manually group 340 the new media file 300.

Finally, in each of the aforementioned scenarios, the client system and the server stay in agreement with each other as to the particular groups that the client system is a member of. Furthermore, the evaluation process of operations in regards to deciding whether the client system should remain in a particular group (or be removed from the group, possibly in order to join a new group) may be performed again in response to one or more events. Grouping operations may also occur in response to the creation or capture of new content on a client device, which is then uploaded to the server for distribution to other member client systems of the group.

Facial Recognition

In the present disclosure, the term "facial recognition" refers to a method of processing a visual query of a facial image performed on a client system having one or more processors and memory storing one or more programs. A visual query of media files comprising one or more facial images is mapped, and possible images that may match with respective facial images are identified in accordance with visual similarity criteria. The potential image matches comprise images from one or more image sources identified in accordance with data regarding the requester. The image match results in one or more persons associated with the potential image matches being identified.

The visual query server system includes a front-end visual query-processing server. The front-end server receives a visual query from the client, and sends the visual query to a plurality of parallel search systems for simultaneous processing. A face recognition search system will access a facial image database to look for facial matches to the image query.

In one embodiment, a media sharing system interacts with a social networking service to identify recognized faces. In such an embodiment, the social networking service may have associated member profiles corresponding to one or more respective members, wherein each of the member profiles includes at least one member image associated with a respective member. Furthermore, each member image includes a representation of a face of the respective member.

In such an embodiment, a client system may send at least one source image, wherein the source image includes a representation of a face. A search service that may be implemented at a server compares at least one of the representations of the faces in the source image to at least some of the representations of the faces in the member images. The search service then communicates to the client system at least one result identifying at least one member who has a member image including a representation of a face that is a match to a representation of a face in the source image. The client system may then use this information to contact that member.

Scene Detection

Another method for sorting media, in the present disclosure, is by grouping media based on detecting the scene in an image or video. The scene representation may be a recognizable instance of the scene based on a realistic, e.g., photographic, drawn, painted, caricatured, cartoon, or other recognizable representation of the scene. The scene may also be a certain scene based on a predefined type or category of scenes or other recognizable scenes with a distinct appearance that distinguishes them from other scenes.

The scene detector includes a classifier for example a classification function based on one or more features of a scene that evaluates the image or part of an image to determine if the scene can be detected or not. The scene detector further includes an adaptive image scanner that processes the input image to divide the image into smaller windows.

The adaptive image scanner scans the input image to divide the image into scanning windows and utilizes a classifier to classify each sub window. The scanning window can be classified with respect to a cascade of homogenous classification functions covering one or more features of the scene. Thereafter, a determination can be made whether a positive detection of the scene can be encountered. If a positive detection is not encountered, scanning may be continued. Otherwise, a reasonable neighborhood can be established such that a higher probability of other detections can be expected. The neighborhood may be searched utilizing fine shift methods in order to discover additional detections. The scene detector outputs an output image with the encountered detections. After the local neighborhood is sought through, the scan can be continued with the rough step corresponding to the actual scale. These encountered detections may be collected and utilized for further processing.

Object Recognition

Yet another method for sorting media, in the present disclosure, is by grouping media based on detecting an object in an image or video. The object representation can be a recognizable instance of the object based on a realistic representation such as a photographic, drawn, painted, caricatured, cartooned, or other recognizable representation of the object. The object may further be a certain object based on a predefined type or category of objects, such as faces, dogs, cars, trees, or other recognizable objects with a distinct appearance that distinguishes them from other objects.

An object detector may further include a classifier for example a classification function based on one or more features of an object that evaluates the image or part of an image to determine if the object can be detected or not. The object detector may also include an adaptive image scanner to process the input image to divide the image into smaller windows.

The adaptive image scanner scans the input image to divide the image into scanning windows and utilizes a classifier to classify each sub window. The scanning window may be classified with respect to a cascade of homogenous classification functions covering one or more features of the object. Next, a determination may be made regarding whether a positive detection of the object may be encountered.

In the event that a positive detection is not encountered, scanning may proceed. Otherwise, a reasonable neighborhood can be established such that a higher probability of other detections can be expected. The neighborhood may be searched utilizing fine shift methods in order to discover additional detections. The object detector outputs an output image with the encountered detections. After the local neighborhood is searched through, the scan may be continued with the rough step corresponding to the actual scale. Encountered detections may then be collected and utilized for further processing.

Location Detection

Another embodiment relates to utilizing location data stored in a media file that was captured using a client device. In one example, the media may be a photograph that is stored as data on a computer-readable medium. The location of the user at the time the photograph was captured may thus correspond to the location of the client device at the time the photograph was captured. The particular media on the client device may further include aperture, shutter speed, ISO, camera mode, focal distance and GPS information. Further, such information may be stored in an EXIF data location on the client device.

In a group detection embodiment, when a person shares photos with a given group of people, and persons in that group have taken photos in the same location, a recommendation is sent to those persons to share photos from the same location into the group. In a new group formation embodiment, when users share photos with the same location and time, a recommendation is sent to form a group. Furthermore, in situations where multiple individuals are located at the same location or on the same network, then such points of relevance may be utilized to form a group. Therefore, other individuals on the network or at a similar physical location do not necessarily have to take a picture themselves to become part of a group, or receive shared media. Furthermore, physical location relevance may be customized in the algorithm to account for how much distance would still be considered a relevant potential group member.

Network Detection

Network detection is an embodiment where a mobile device may be connected to via Wi-Fi to a local area network and may have the capability of transmitting and receiving data (e.g., voice, text, images, and/or multimedia data). When the same application on the client device is launched, other client systems on the network may be able to detect the presence of other client devices with the same application active.

Users of a mobile application on the same network may be able to automatically create a group with all other users of the mobile application on the same network. Group detection occurs when users on the network are already in a group together, then a recommendation is sent to share media. Group formation occurs when all users on the network are populated in the "to:" field of a new group compose screen.

Identification

Figure 4:
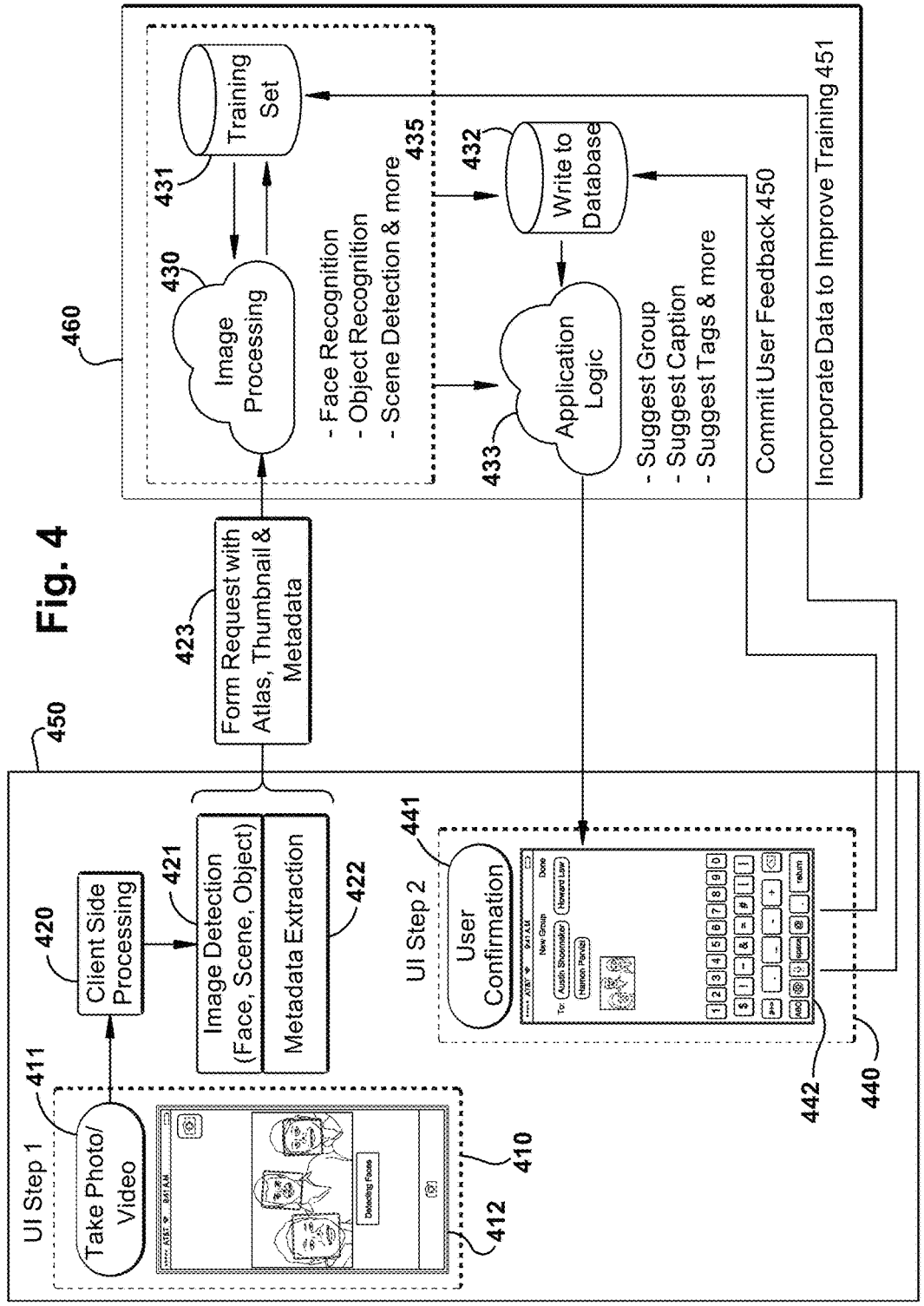
FIG. 4 illustrates how a media sharing service may query a database or social network to retrieve personal profile information in accordance with an embodiment of the present disclosure.

FIG. 4 depicts interactions between a client system and a server when processing a new media file. In one embodiment, a server system 460 may receive a visual query 423 from a client system 450. The client system 450, for example, may be a mobile phone 510, a tablet device 520, a desktop computing device 530, or another similar device. When new media is created 411, the client system 450 may process the new media 420 for the detection of faces, scenes, and objects 421. Additionally, the client system 450 may process the media to extract useful metadata 422. Having performed these tasks, the client system 450 may then form a request to the server 460 in the form of a visual query 423 comprising of thumbnail pictures, atlas, and metadata information.

In an example scenario, in a first step 410, a user may take a photograph of his friend 411 using a mobile phone user interface 412. Subsequently, the client system 450 may submit processed parts of the photograph 421 422 as the visual query 423 to the server system 460.

At the server system 460, the visual query 423 may be processed, via a search service 430, by having the image component of the query compared amongst a database of identified persons, objects, and scenes 431. In one embodiment, for each identifiable person in the database 431, there exists at least one photograph and a profile containing descriptive information. Such photos and descriptive information may be retrieved from a social networking service. The social networking service may be one of, but not limited to, the following exemplar services: Facebook®, Google+®, Twitter®, Instagram®, Foursquare®, LinkedIn® and Flickr®.

In one embodiment, the image processing engine 430 and training set database 431 operate in conjunction as a search service 435 in order to extract textual tags of a visual query 423 from a client system 450 and search the database 431 against those tags. Such a search may result in, but not limited to, facial recognition, object recognition, and scene detection in an image. The results of the search may be fed to application logic 433 and accompanying database 432. Application logic 433 and accompanying database 432 may generate suggestions for, but not limited to, groups, captions, and tags. These suggestions are presented to the user in a form of a confirmation user interface 442. Lastly, in a second confirmation step 440, the user either confirms or rejects the suggestions 441. This user feedback 450 is then committed to the accompanying database 432. Additionally, user feedback data 451 is incorporated into the training set database 431 to improve training.

Training

With respect to training in certain embodiments, compartmentalization of information is expected. If a user is sharing photos, the ability to recognize particular people is dependent upon the data set the user has access to. In such an example, each person effectively has their own recognition model. In one embodiment, for facial recognition, the server system 460 has positive and negative training examples. For example, the server system 460 may have 10 photos where a user was correctly tagged in the photos and 2 photos where the server incorrectly tagged the user in the photos. These examples can merge into a model that can recognize a face with some confidence. Each user can have their own training set, and only photos that the user can see can become part of the training set. Given that, each user can have their own recognition model based on the photos they have access to. In one embodiment, there is no side channel leakage of information.

In one embodiment of training, the server system 460 ranks, based on the model, a set of candidates during facial recognition. A recognizer can provide a user with N best matches of results during facial recognition with a confidence score for each of the N best matches. In one embodiment, the server system 460 provides the user with the best match for a face. In another embodiment, the server system 460 provides the user with two or more identities of user profiles for a face and lets the user select which identity is the correct identity for the face. Among a set of different faces, the server system 460 can provide recommendations based on a confidence score associated with the identities.

Thus, a method and system to define groups, through image recognition, to share content among several communication devices has been described. Although the present subject matter has been described with reference to specific example embodiments, it will be evident that various modifications and changes may be made to these embodiments without departing from the broader scope of the subject matter. For example, while the majority of the discussion above notes the use of the embodiments with respect to computer systems and applications, other software- or firmware-based systems, such as electronic products and systems employing embedded firmware, may also be developed in a similar manner to that discussed herein. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving, at a computing device, a media file captured and uploaded via a client device of a first user, said receiving occurs automatically upon said capture, said media file comprising at least one image frame depicting a digital representation of a second user, said digital representation of the second user being different than a digital representation of the first user;
analyzing, via the computing device using facial recognition software, the media file, said analysis comprising the computing device executing the facial recognition software, and upon said execution, identifying data in the media file that is associated with a face of the second user;
generating, via the computing device, a search query comprising information related to the face data of the second user identified from the media file via said facial recognition analysis;
searching, via the computing device, a facial data database based on the generated search query, said search comprising analyzing facial data in the facial data database based on the face data of the second user, and determining, based on said analysis, information comprising an identity of the second user;
searching, via the computing device, a profile database based on the identity information of the second user, and identifying, based on said search, a profile of the second user;
forming, on a network via the computing device, a group specific to said network, said group comprising the first user and the second user, said group further comprising information indicating a profile of the first user and the second user profile; and
communicating, via the computing device, the media file to the group, said communication causing, via the computing device over the network, said media file to be shared between the first and second users such that the media file is populated within the profile of both the first and second user.

2. The method of claim 1, further comprising:
receiving a second media file uploaded via the client device of the first user, said second media file comprising at least one image frame depicting another digital representation of the second user;
executing the facial recognition software on said second media file, and upon said execution, identifying data in the second media file that is associated with a face of the second user;
determining, based on the identifying data of the second user, that the second user is part of said group, said group being identified as an existing group on the network; and
communicating the second media file to the first and second users via said group on the network.

3. The method of claim 1, further comprising:
receiving a third media file uploaded via a client device of the second user, said third media file comprising at least one image frame with content depicting a digital representation of the first user;
executing the facial recognition software on said third media file causing identification of data in the third media file that is associated with a face of the first user;

determining, based on the identifying data of the first user, that the first user is part of said group on the network; and communicating the third media file to the first and second users via said group on the network.

4. The method of claim 1, wherein said media file is a video file.

5. The method of claim 1, wherein said media file is an image file.

6. The method of claim 1, further comprising:

analyzing the media file, and based on said analysis, identifying tags associated with the digital representation of the second user;

extracting said tags from said media file, wherein said search of the profile database is based on said tags.

7. The method of claim 1, wherein said network is an electronic social network, and said profiles are profiles within said electronic social network.

8. A non-transitory computer-readable storage medium tangibly encoded with computer-executable instructions, that when executed by a computing device, perform a method comprising:

receiving, at the computing device, a media file captured and uploaded via a client device of a first user, said receiving occurs automatically upon said capture, said media file comprising at least one image frame depicting a digital representation of a second user, said digital representation of the second user being different than a digital representation of the first user;

analyzing, via the computing device using facial recognition software, the media file, said analysis comprising the computing device executing the facial recognition software, and upon said execution, identifying data in the media file that is associated with a face of the second user;

generating, via the computing device, a search query comprising information related to the face data of the second user identified from the media file via said facial recognition analysis;

searching, via the computing device, a facial data database based on the generated search query, said search comprising analyzing facial data in the facial data database based on the face data of the second user, and determining, based on said analysis, information comprising an identity of the second user;

searching, via the computing device, a profile database based on the identity information of the second user, and identifying, based on said search, a profile of the second user;

forming, on a network via the computing device, a group specific to said network, said group comprising the first user and the second user, said group further comprising information indicating a profile of the first user and the second user profile; and communicating, via the computing device, the media file to the group, said communication causing, via the computing device over the network, said media file to be shared between the first and second users such that the media file is populated within the profile of both the first and second user.

9. The non-transitory computer-readable storage medium of claim 8, further comprising:

receiving a second media file uploaded via the client device of the first user, said second media file comprising at least one image frame depicting another digital representation of the second user;

executing the facial recognition software on said second media file, and upon said execution, identifying data in the second media file that is associated with a face of the second user;

determining, based on the identifying data of the second user, that the second user is part of said group, said group being identified as an existing group on the network; and communicating the second media file to the first and second users via said group on the network.

10. The non-transitory computer-readable storage medium of claim 8, further comprising:

receiving a third media file uploaded via a client device of the second user, said third media file comprising at least one image frame with content depicting a digital representation of the first user;

executing the facial recognition software on said third media file causing identification of data in the third media file that is associated with a face of the first user;

determining, based on the identifying data of the first user, that the first user is part of said group on the network; and communicating the third media file to the first and second users via said group on the network.

11. The non-transitory computer-readable storage medium of claim 8, further comprising:

analyzing the media file, and based on said analysis, identifying tags associated with the digital representation of the second user;

extracting said tags from said media file, wherein said search of the profile database is based on said tags.

12. The non-transitory computer-readable storage medium of claim 8, wherein said network is an electronic social network, and said profiles are profiles within said electronic social network.

13. A computing device comprising:

a processor;

a non-transitory computer-readable storage medium tangibly storing thereon program logic for execution by the processor, the stored program logic comprising:

logic executed by the processor for receiving, at the computing device, a media file captured and uploaded via a client device of a first user, said receiving occurs automatically upon said capture, said media file comprising at least one image frame depicting a digital representation of a second user, said digital representation of the second user being different than a digital representation of the first user;

logic executed by the processor for analyzing, via the computing device using facial recognition software, the media file, said analysis comprising the computing device executing the facial recognition software, and upon said execution, identifying data in the media file that is associated with a face of the second user;

logic executed by the processor for generating, via the computing device, a search query comprising information related to the face data of the second user identified from the media file via said facial recognition analysis;

logic executed by the processor for searching, via the computing device, a facial data database based on the generated search query, said search comprising analyzing facial data in the facial data database based on the face data of the second user, and determining, based on said analysis, information comprising an identity of the second user;

logic executed by the processor for searching, via the computing device, a profile database based on the identity information of the second user, and identifying, based on said search, a profile of the second user;

logic executed by the processor for forming, on a network via the computing device, a group specific to said network, said group comprising the first user and the second user, said group further comprising information indicating a profile of the first user and the second user profile; and logic executed by the processor for communicating, via the computing device, the media file to the group, said communication causing, via the computing device over the network, said media file to be shared between the first and second users such that the media file is populated within the profile of both the first and second user.

14. The computing device of claim 13, further comprising:

receiving a second media file uploaded via the client device of the first user, said second media file comprising at least one image frame depicting another digital representation of the second user;

executing the facial recognition software on said second media file, and upon said execution, identifying data in the second media file that is associated with a face of the second user;

determining, based on the identifying data of the second user, that the second user is part of said group, said group being identified as an existing group on the network; and communicating the second media file to the first and second users via said group on the network.

15. The computing device of claim 13, further comprising:

receiving a third media file uploaded via a client device of the second user, said third media file comprising at least one image frame with content depicting a digital representation of the first user;

executing the facial recognition software on said third media file causing identification of data in the third media file that is associated with a face of the first user;

determining, based on the identifying data of the first user, that the first user is part of said group on the network; and communicating the third media file to the first and second users via said group on the network.

16. The computing device of claim 13, further comprising:

analyzing the media file, and based on said analysis, identifying tags associated with the digital representation of the second user;

extracting said tags from said media file, wherein said search of the profile database is based on said tags.

17. The computing device of claim 13, wherein said network is an electronic social network, and said profiles are profiles within said electronic social network.

* * * * *